July 13, 1965 M. G. J. FRY 3,195,038
VOLTAGE OR CURRENT REGULATOR APPARATUS
Filed May 14, 1962 5 Sheets-Sheet 1
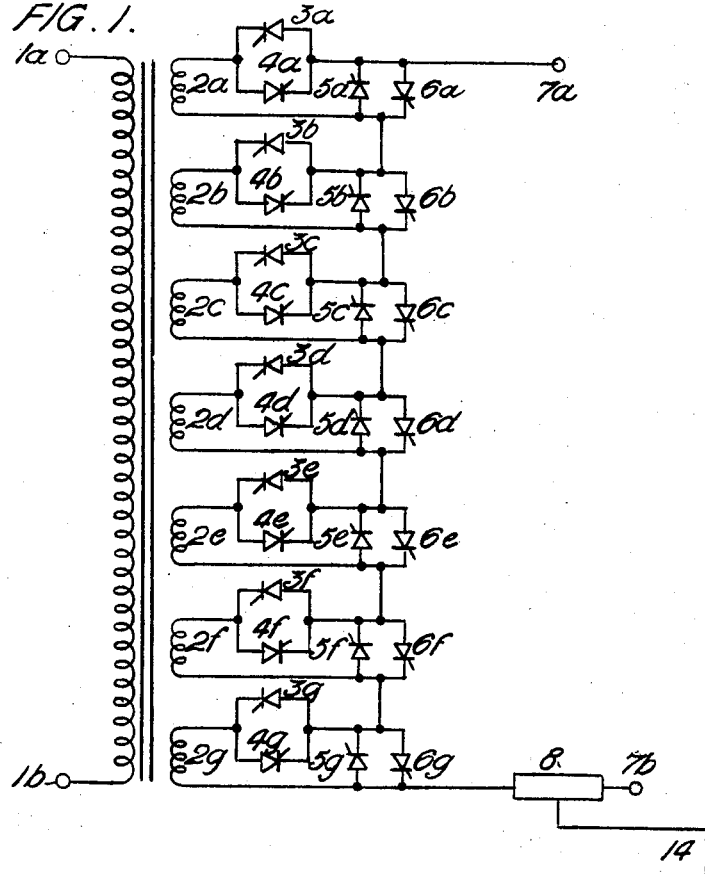
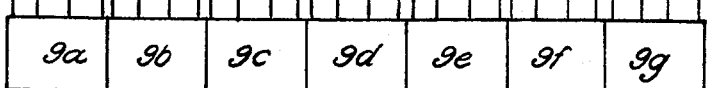
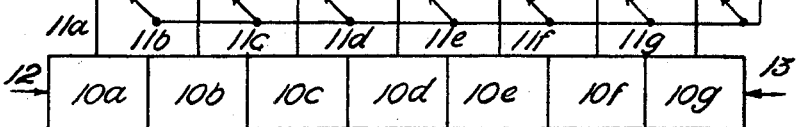

July 13, 1965  M. G. J. FRY  3,195,038
VOLTAGE OR CURRENT REGULATOR APPARATUS
Filed May 14, 1962  5 Sheets-Sheet 3
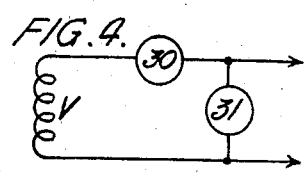
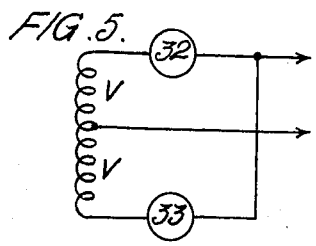
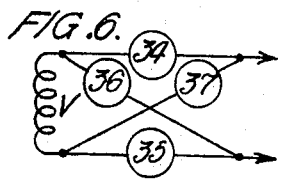
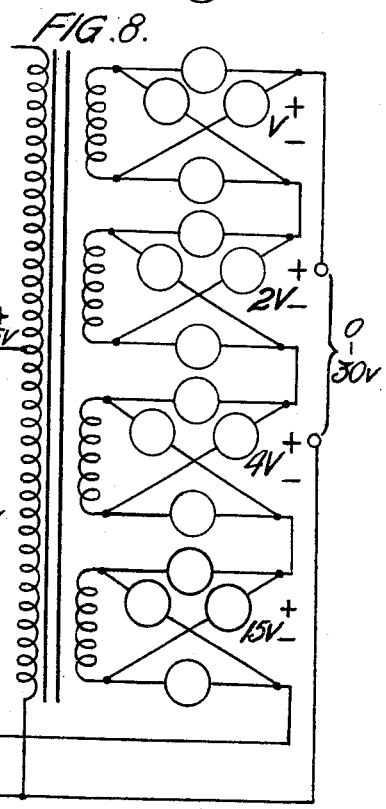
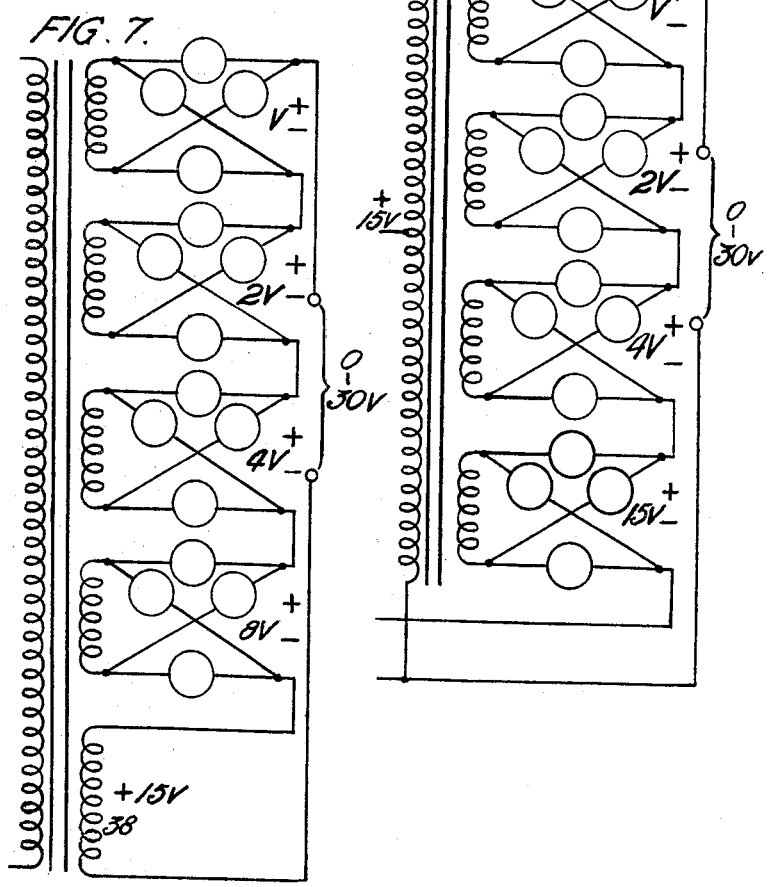

July 13, 1965   M. G. J. FRY   3,195,038
VOLTAGE OR CURRENT REGULATOR APPARATUS
Filed May 14, 1962                                                5 Sheets-Sheet 4
FIG. 10.
FIG. 9.
FIG. 11.
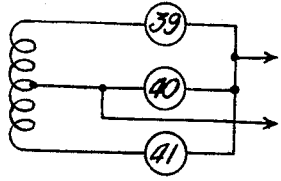
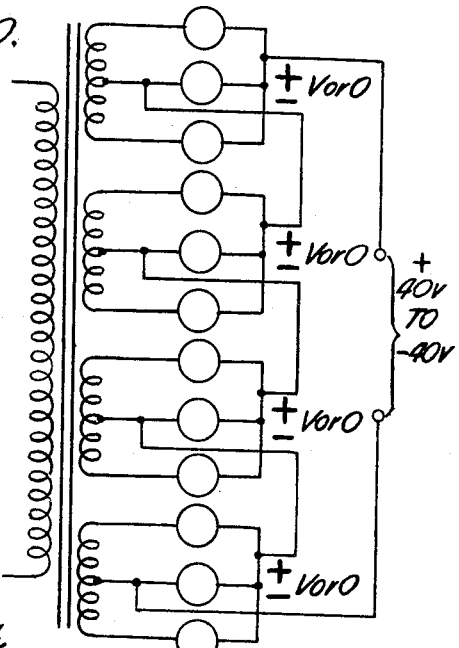
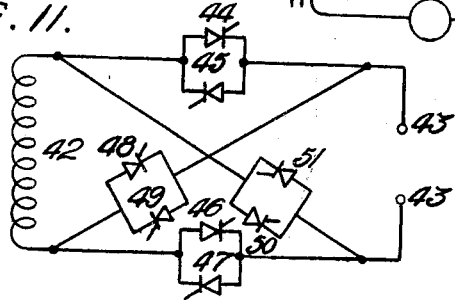
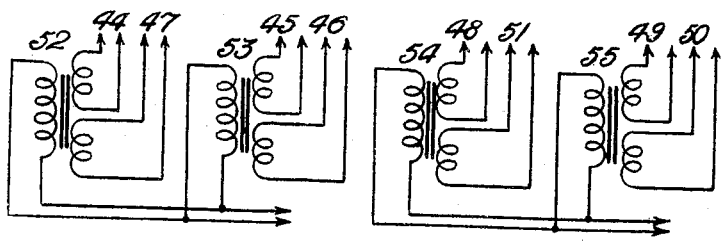

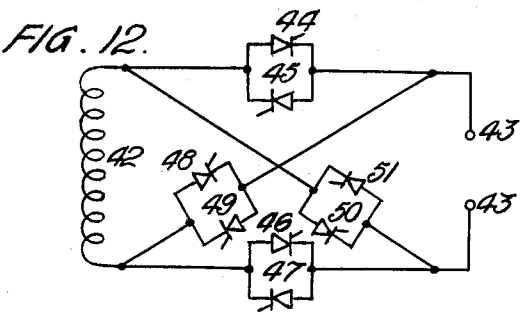
FIG. 12.
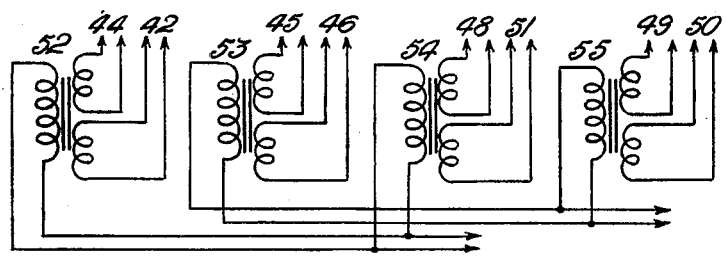
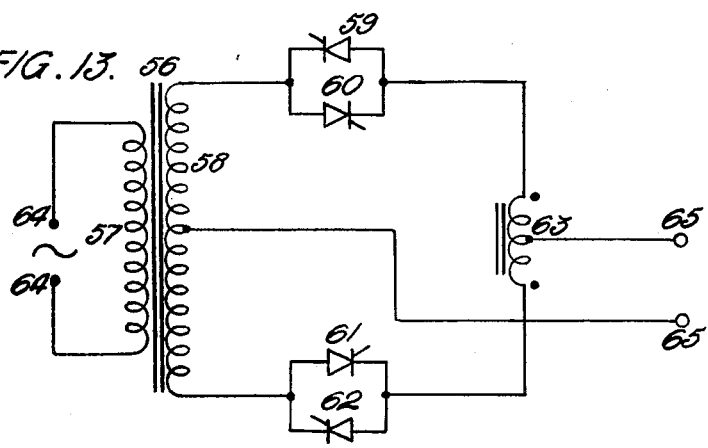
FIG. 13.

United States Patent Office 3,195,038
Patented July 13, 1965

3,195,038
VOLTAGE OR CURRENT REGULATOR APPARATUS
Michael George Joseph Fry, Sussex, England, assignor to Brentford Electric Limited, Crawley, England, a British company
Filed May 14, 1962, Ser. No. 195,047
Claims priority, application Great Britain, May 15, 1961, 17,646/61
12 Claims. (Cl. 323—25)

The invention relates to voltage or current regulator apparatus, e.g. variable ratio transforming apparatus for the conversion of electrical energy from one voltage or current to another.

The invention provides, in one of its aspects, voltage or current regulator apparatus comprising a plurality of transformer windings or sources of alternating current, a plurality of switch means associated respectively with the windings or sources, each of which switch means is changeable between a condition in which it connects the associated winding or source into a circuit, and a condition in which the associated winding or source is by-passed in the circuit without being short-circuited, and control means for causing the switch means to connect a selected one or more of the windings or sources in series in the circuit.

Preferably the switch means include silicon controlled rectifiers, or other switch devices which require to be repeatedly triggered to maintain the switch means in one of the said conditions, and the control means include means for repeatedly triggering selected devices, preferably at instants of a substantially fixed time relationship with the current zeros in said circuit.

Each switch means may include a pair of switch devices, as aforesaid, in parallel and respectively providing, when repeatedly triggered, uni-directional conducting paths in opposite directions, and the arrangement is preferably such that when they are being repeatedly triggered the triggering occurs at instants such as to cause them to present a substantially full-wave conducting path. Preferably there is a pair of switch devices, as aforesaid, in parallel with the winding or source to provide the said by-pass, and a pair of switch devices, as aforesaid, in series with the winding or source to isolate the winding or source from the circuit when the winding or source is by-passed.

Alternatively each switch means may comprise two rectifier bridge circuits each having a switch device, as aforesaid, connected across one diagonal of the bridge, one of the said bridge circuits having its other diagonal connected in the said by-pass and the other of the said bridge circuits having its other diagonal connected in series with the winding or source, and means are provided for repeatedly triggering one or the other of the switch devices, selectively.

In another of its aspects the invention provides voltage regulator apparatus comprising a transformer having a primary and a plurality of secondary windings, a plurality of switch means associated respectively with the secondary windings, which switch means include silicon controlled rectifiers or other switch devices which require to be repeatedly triggered to maintain the switch means in a substantially conducting or a substantially non-conducting condition for alternating current, and control means for repeatedly triggering selected switch devices in such a way as to provide at output terminals a unidirectional voltage of prescribed magnitude and direction. Preferably the unidirectional voltage is full-wave.

The output terminals may be connected to a passive load to pass unidirectional current therethrough. Alternatively a direct voltage may be applied to the output terminals of such polarity and magnitude that the effective flow of power through the apparatus is from the output terminals to the primary winding.

Preferably the control means include a counting circuit or other data storing register and the windings or sources are selected in accordance with the number or other data stored in the register. Preferably the windings or sources provide voltages which are respectively in geometric progression and the control means include a digital number storing register, successive digits of which correspond to the voltages of the respective windings or sources or to the voltages of selected combinations of windings or sources. The register is preferably a counter which is capable of adding and subtracting, so that the voltage supplied to the circuit may be increased or decreased by causing the counter to add or subtract respectively.

The invention provides, in another of its aspects, a static variable ratio on-load voltage transforming device comprising an A.C. transformer having two or more secondary windings, one or more silicon controlled rectifiers or other triggered bistable devices associated with each of the said secondary windings, such that, by selective triggering of the said devices the associated winding may be connected in series with or excluded from the load circuit, means for triggering the selected bistable devices at instants substantially fixed relative to the current zeros, and means for selecting the combination of devices to be triggered to achieve the desired transformation ratio.

The following is a description, by way of example, of some specific embodiments of the invention in which reference is made to the accompanying drawings of which:

FIGURE 1 is a diagram of a transformer having seven controlled secondary windings.

FIGURE 4 is a diagram illustrating a single secondary winding with its associated rectifier circuits.

FIGURE 5 is a diagram illustrating a configuration whereby a voltage of either polarity may be obtained.

FIGURE 6 is a diagram illustrating an alternative configuration whereby a voltage of either polarity may be obtained.

FIGURE 7 is a diagram illustrating a transformer having five secondary windings, four of which are controlled in a manner according to the invention.

FIGURE 8 is a diagram illustrating a transformer of which the secondary winding of FIGURE 7 which is not controlled is connected in auto-transformer configuration.

FIGURE 9 is a diagram illustrating a configuration whereby three alternative outputs may be obtained from a single secondary winding.

FIGURE 10 is a diagram illustrating application of the configuration of FIGURE 9 to a transformer.

FIGURE 11 is a diagram illustrating in greater detail the configuration of FIGURE 6, the triggering sequence being such as to derive a sine-wave output.

FIGURE 12 is a diagram illustrating in greater detail the configuration of FIGURE 6, the triggering sequence being such as to derive a full-wave rectified output.

FIGURE 13 is a circuit diagram of a device for controlling the flow of power between direct and alternating current supplies.

Figure 2:
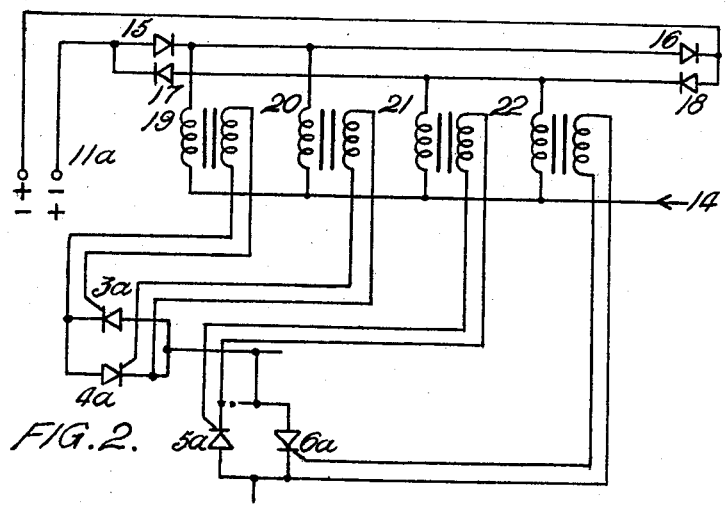
FIGURE 2 is a diagram illustrating the triggering circuits for the controlled rectifiers of FIGURE 1.

FIGURE 1 shows an A.C. transformer with a primary winding 1, supplied at terminals 1a, 1b with A.C. energy. Secondary windings 2a–2g, are each associated with silicon controlled rectifiers 3a–g, 4a–g, 5a–g, 6a–g in such a way that if any rectifier 3a–g, 4a–g is conducting while its associated rectifiers 5a–g, 6a–g are blocked, the associated secondary winding 2a–g is connected in series with the output terminals 7a, 7b to which the load is connected.

Similarly if any rectifier 5a–g, 6a–g is conducting while its associated rectifiers 3a–g, 4a–g are blocked, its associated secondary winding is effectively excluded from the circuit between terminals 7a, 7b. Rectifiers 3a–g, 4a–g, if triggered will conduct in alternate half cycles of the supply current and a similar relation exists for rectifiers 5a–g and 6a–g.

If the "firing" or switching time of the silicon controlled rectifiers is small compared with the duration of one-half period of the supply frequency and if the forward voltage drop of the silicon controlled rectifier in its conducting state is small compared with the voltage produced by its associated transformer secondary winding, the waveform of the current produced by that winding will be substantially unaffected by the presence of the rectifiers.

If in addition the voltages produced by the windings 2a, 2b, 2c, 2d, 2e, 2f, 2g are in geometrical progression of ratio two, i.e. are in the ratios 1, 2, 4, 8, 16, 32, 64 respectively, it is clear that by selective triggering of the silicon controlled rectifiers a voltage may be produced at the terminals 7a, 7b, corresponding to any secondary voltage from 0 to 127 units in steps of one unit.

Thus, there are provided means of controlling the effective ratio of an A.C. transformer by means of triggered bistable devices in a manner which produces a virtually distortion-free waveform at every ratio in the control range, a response time which may be limited to one half-period of the supply waveform and with a subdivision of the control range into steps which may be made less than any pre-assigned acceptable minimum.

The selective triggering of the silicon controlled rectifiers is achieved with the aid of elements 10a–g which form a reversible 7-bit binary digital counter and which set up on lead 11a–g a pattern of positive and negative voltages corresponding in binary digital code to the sum of control voltage pulses introduced on lead 12 minus the sum of control pulses introduced on lead 13.

Each lead, 11a–g, controls a corresponding gating element, 9a–g, while a saturating load current transformer, 8, produces voltage impulses substantially at each load current zero and of opposite polarity at each alternate current zero, which are fed through lead 14 to each gating element 9a–g simultaneously. All gating elements are similar and taking element 9a as typical, the element is so connected that with a voltage of one polarity on lead 11a, alternate trigger pulses from lead 14 are fed to the trigger electrodes of silicon controlled rectifiers 3a and 4a, while the trigger electrodes of silicon controlled rectifiers 5a and 6a receive no impulses. When the polarity of the voltage on lead 11a reverses, alternate voltage pulses from lead 14 are fed to the trigger electrodes of silicon controlled rectifiers 5a and 6a, while the trigger electrodes of silicon controlled rectifiers 3a and 4a receive no impulses.

One embodiment of the gate circuit used to control the silicon controlled rectifiers is shown in FIGURE 2. Diodes 15, 16, 17, 18 are fed by leads 11a with a constant voltage of reversible polarity, symmetrical with respect to earth potential by the binary counter element 10a (FIGURE 1). Depending on the digit stored by counter element 10a, either diodes 15 and 16 conduct and diodes 17, 18 are blocked or vice versa. Pulse transformers 19, 20 have their primary windings joined at one end to the junction of diodes 15, 16, and transformers 21, 22 are similarly connected to diodes 17, 18. The free ends of all four transformers are joined to lead 14 which feeds in alternately opposed trigger pulses from current transformer 8 (FIGURE 1). The secondary windings of each transformer 19, 20, 21, 22 are connected to the cathode and trigger electrodes of corresponding silicon controlled rectifiers.

If the polarity of the voltage on leads 11a is such that diodes 15, 16 are conducting and diodes 17, 18 are blocked, the upper ends of transformers 19 and 20 are effectively earthed, while those of transformers 21, 22 are isolated. No trigger pulses are therefore fed to silicon controlled rectifiers 5a, 6a while silicon controlled rectifiers 3a, 4a receive pulses via lead 14 and transformers 19, 20 of the polarity required to make them fire at the start of the appropriate half cycle of the load current.

Similarly reversal of voltage on leads 11a, blocks trigger pulses to silicon controlled rectifiers 3a, 4a and feeds pulses to silicon controlled rectifiers 5a and 6a. The secondary windings of transformers 19, 20, 21, 22 are insulated to a level commensurate with the operating potential above earth of the silicon controlled rectifier to which each is connected.

Figure 3:
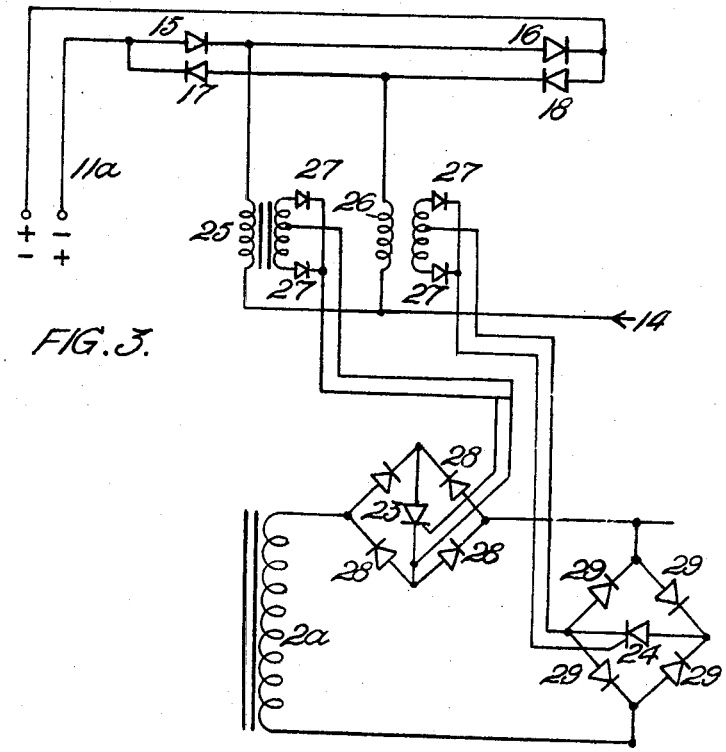
FIGURE 3 is a diagram illustrating an alternative form of rectifier configuration and triggering circuitry.

An alternative form of the invention is shown in FIGURE 3, in which the parallel-connected pairs of silicon controlled rectifiers 3a, 4a and 5a, 6a are replaced by single silicon controlled rectifiers 23, 24, connected across the mid-points of rectifier bridge circuits 28, 29. In this arrangement the silicon controlled rectifiers when triggered conduct during every half cycle instead of during alternate half cycles, and therefore require unidirectional trigger pulses at every current zero. Two pulse transformers only are used (25, 26) each with a centre tapped secondary winding. Additional diodes, 27, rectify alternate trigger pulses to ensure a unidirectional train of pulses for triggering the silicon controlled rectifiers.

In FIGURE 4 a single secondary winding is shown with its associated silicon controlled rectifiers. The circular symbols 30, 31 each represent either a pair of parallel connected silicon controlled rectifiers (3a, 4a in FIGURE 2) or a single silicon controlled rectifier in a bridge rectifier circuit (23, 28 in FIGURE 3). If the effective voltage of the winding is V, the contribution of the winding to the output voltage is V or zero according to whether element 30 or 31 is conducting. Other forms of the invention are shown in FIGURES 5 and 6 as follows:

| Figure | Conducting element(s) | Output |
| --- | --- | --- |
| 5 | 32 | +V |
|   | 33 | −V |
| 6 | 34, 35 | +V |
|   | 36, 37 | −V |
|   | 34, 36 | 0 |
|   | 35, 37 | 0 |

With secondary windings having voltages in geometrical progression with ratio two, the circuits of FIGURES 5 and 6 give the full voltage range of the circuit shown in FIGURE 4, but with either polarity. In another form of the invention (FIGURE 7), a plurality of secondary windings connected as in either FIGURE 5 or FIGURE 6 is connected in series with a winding 38, having no triggered switch elements and having a voltage equal to the sum of the voltages produced by the switched secondary windings. This connection gives a double range of voltage variation without polarity reversal.

In FIGURE 8 the unswitched winding forms part of the primary winding of the transformer in auto-transformer connection.

In FIGURE 9 the secondary windings are each shown centre-tapped and fitted with three triggered switch devices such that the output voltage of the combination is +V, 0 or −V as elements 39, 40, 41 conduct respectively. FIGURE 10 shows this circuit used with a transformer having secondary windings with output voltages in geometrical progression with ratio 3. With 4 windings in ratio 1:3:9:27 the output range of +40 units to −40 units may be covered in steps of one unit of voltage.

FIGURE 11 shows in detail the arrangement of silicon controlled rectifiers used with each secondary winding connected as in FIGURE 6, together with the associated pulse transformers feeding the trigger electrodes. It is clear that with pulse transformers 52 and 53 having paralleled primary windings and with transformers 55 and 56 being similarly paralleled, either the rectifier pairs 44, 47 and 45, 46 conduct on alternate half-cycles of the supply current or the rectifier pairs 48, 51 and 49, 50 will so conduct. This leads as described to the appearance at terminals 43 of a sinusoidal alternating voltage of either polarity.

The circuit of FIGURE 12 is identical with that of FIGURE 11 with the sole exception that in the former circuit, transformers 52, 54 and 53, 55 now form parallel-connected pairs. It will now be apparent that either the rectifier pairs 44, 47 and 48, 51 conduct on alternate half-cycles of the supply current or the rectifier pairs 45, 46 and 49, 50 so conduct. The voltage appearing at terminals 43, is then a direct voltage of full-wave rectified sinusoidal form having a polarity dependent on the sets of rectifiers which receive triggering pulses from the pulse transformers.

By similar minor changes to the circuits controlling the flow of trigger pulses to the trigger electrodes of the silicon controlled recitifiers any of the combinations of power transformer windings and silicon controlled rectifiers handling the main flow of energy may without modification be caused to deliver alternating current, or direct current of either polarity or nor current as required.

FIGURE 13 shows a multi-winding transformer 56 one of the secondary windings of which is shown at 58 and of which the primary winding, 57, is connected to an A.C. supply mains at terminals 64. The secondary winding 58 and its associated silicon controlled rectifiers 59, 60, 61, 62 are connected in the circuit of FIGURE 5 to a D.C. supply mains at terminals 65, via a centre-tapped auto-transformer, 63. The voltage of the D.C. supply mains at terminals 65, is higher than the peak voltage induced in winding 58, by the A.C. supply mains at terminals 64. Triggering and selecting circuits are arranged by means previously described, to trigger into their conducting state the rectifiers 59, 60, 61 and 62 during those half cycles of the supply voltage when the direct voltage at terminals 65 opposes the voltage induced in winding 58 by the alternating supply voltage at terminals 64. Transformer 63 ensures that as any rectifier is triggered into its conducting state, a voltage is developed across the rectifier in the opposite arm of the circuit which is already conducting, adequate in magnitude and polarity to drive the said rectifier into its non-conducting state.

The flow of energy in this circuit is effectively reversed, i.e. from the D.C. supply terminals 65, to the A.C. supply terminals 64, and that by using a plurality of secondary windings and controlled rectifiers with D.C. supply terminals connected in series as previously described, an effective control over the reverse flow of energy may be exercised.

By suitable application of selecting and triggering voltages and by suitable choice of transformation ratios, control may be effectively exercised over the reverse flow of alternating current power in a manner substantially as hereinbefore described.

A saturable reactor constructed with a core of material possessing a substantially rectangular magnetisation characteristic may be connected in a "flux-resetting" circuit of otherwise to provide a device having:

(a) A non-conducting or high impedance state.
(b) A conducting or low-impedance state.
(c) Terminals to which the application of the appropriate voltage will cause the device to revert from state (a) to state (b) in a time short compared with one half-period of the supply current.

The present invention, although herein described more particularly with reference to the use of silicon controlled rectifiers, is not limited to these specific embodiments, which are included as example only. As another example, for instance, the invention may also be realised by the use of such saturable reactors as described or, mutatis mutandis, by the use of any other triggered bistable device possessing the properties enumerated under (a), (b) and (c) above.

It is also envisaged in the present invention that any or all of the devices hereinbefore described may be used in a variety of combinations of parallel, series or cascade connections utilising two or more transformers.

I claim:

1. Voltage or current regulator apparatus for regulating the voltage or current in a circuit in which an alternating current flows, comprising at least one electrical current source; switch means associated with the said source, which switch means is triggerable into a condition in which it connects the source into the circuit; said switch means comprising a switch device which requires to be triggered in each cycle of the said alternating current to maintain the switch means in the said condition, and control means operatively connected to the said device and responsive to the zero current instants of the alternating current in the said circuit to repeatedly trigger the said device in predetermined time relationship with the said zero current instants to connect the said source in the circuit for substantially the whole cycle of each of selected cycles of the alternating current in the said circuit.

2. Voltage or current regulator apparatus for regulating the voltage or current in a circuit in which an alternating current flows, comprising a plurality of alternating current sources; a plurality of switch means associated respectively with the sources, each of which switch means is changeable between a condition in which it connects the associated source into the circuit and a condition in which the said associated source is by-passed in the circuit without being short circuited; each of said switch means comprising a switch device which requires to be triggered in each cycle of said alternating current to maintain the switch means in one of the said conditions, and control means operatively connected to the said devices and responsive to the zero current instants of the alternating current in the said circuit to repeatedly trigger selected devices in predetermined time relationship with the said zero current instants to connect selected sources in the circuit for substantially the whole cycle of each of selected cycles in the alternating current in the said circuit.

3. Voltage or current regulator apparatus for regulating the voltage or current in a circuit in which an alternating current flows, comprising a plurality of alternating current sources; a plurality of switch means associated respectively with the sources, each of which switch means is changeable between a condition in which it connects the associated source into the circuit and a condition in which the said associated source is by-passed in the circuit without being short circuited; each of said switch means including a switch unit comprising a pair of switch devices each of which requires to be triggered in each cycle of said alternating current to maintain the switch means in one of the said conditions, the two switch devices of the said pair being connected in parallel and respectively providing when triggered two unidirectional conducting paths in opposite directions; and control means operatively connected to the said devices and responsive to the zero current instants of the alternating current in the said circuit to repeatedly trigger selected pairs of the said devices in predetermined relationship with the said zero current instants to connect selected sources in the circuit for substantially the whole cycle of each of selected cycles of the alternating current in the said circuit.

4. Voltage or current regulator apparatus for regulating the voltage or current in a circuit in which an alternating current flows, comprising a plurality of alternating current sources; a plurality of switch means associated respectively with the sources, each of which switch means is changeable between a condition in which it connects the associated source into the circuit and a condition in which the said associated source is by-passed in the circuit without being short circuited; each of said switch means including a switch unit comprising a pair of triggerable semiconducting devices each of which requires to be triggered in each cycle of said alternating current to maintain the switch means in one of the said conditions, the two devices of the said pair being connected in parallel and respectively providing when triggered two unidirectional conducting paths in opposite directions; and control means operatively connected to the said devices and responsive to the zero current instants of the alternating current in the said circuit to repeatedly trigger selected pairs of the said devices in predetermined relationship with the said zero current instants to connect selected sources in the circuit for substantially the whole cycle of each of selected cycles of the alternating current in the said circuit.

5. Voltage or current regulator apparatus as claimed in claim 4, in which the said triggerable semi-conducting devices each comprise a silicon controlled rectifier.

6. Voltage or current regulator apparatus for regulating the voltage or current in a circuit in which an alternating current flows, comprising transformer means including a plurality of secondary windings, the output voltages of successive secondary windings being in geometrical progression of ratio two, there being first and second points in the said circuit associated with each one of the said secondary windings respectively, one end of each secondary winding being directly connected to a first point in the circuit, and the other end of the said secondary winding being connected through a first switch unit associated with the said secondary winding to a second point in the circuit, the said second point associated with the said secondary winding being directly connected to the first point associated with the next secondary winding and the said second point associated with the said secondary winding also being connected to the said first point associated with the said same secondary winding through a second switch unit, each of said switch units comprising two triggerable semi-conductor devices each of which requires triggering in each cycle of the alternating current in the said circuit to render it conducting during that cycle, the said two devices being connected in parallel with each other and providing when both triggered a bi-directional conducting path, and control means operatively connected to each of the said devices and responsive to the zero current instants of the alternating current in the said circuit to trigger the devices of one of the two switch units associated with each secondary winding to render conducting either the first switch unit to connect the said secondary winding in series in the circuit or the second switch unit to by-pass the said secondary winding in the circuit without short circuiting it, the said control means comprising a saturating load current transformer connected in series in the said circuit to produce voltage impulses substantially at each zero current instant in the said circuit and of opposite polarity at each alternate current zero, a binary digital counter having a plurality of bit-stores one associated with each of the said transformer secondaries, each bit-store providing an output of one polarity when it registers zero and the reverse polarity when it registers one, a plurality of gating elements each operatively connected to one of the said bit-stores and to the said associated transformer secondary winding and also to the said load current saturating transformer to receive the said voltage impulses therefrom, each gating element comprising polarity-responsive rectifier means responsive to the polarity of the output of the bit-store to which it is connected, and a plurality of transformer means each connected to the polarity-responsive rectifier means and to one of the triggerable semi-conductor devices of one of the switch units of the transformer secondary winding with which the gating element is associated and also to the load current saturating transformer, the polarity-responsive rectifier means actuating the transformer means in response to the polarity of the output of the associated bit-store to gate each voltage impulse from the saturating load current transformer to trigger the semi-conductor devices of one of the switch units of the associated transformer secondary winding to connect the said secondary winding as aforesaid, selected secondary windings being thereby connected in series in the circuit in accordance with the binary number registered in the said binary counter.

7. Voltage or current regulator apparatus for regulating the voltage or current in a circuit in which an alternating current flows, comprising transformer means including a plurality of secondary windings, the output voltages of successive secondary windings being in geometrical progression of ratio two, there being first and second points in the said circuit associated with each one of the said secondary windings respectively, one end of each secondary winding being directly connected to a first point in the circuit, and the other end of the said secondary winding being connected through a first switch unit associated with the said secondary winding to a second point in the circuit, the said second point associated with the said secondary winding being directly connected to the first point associated with next secondary winding and the said second point associated with the said secondary winding also being connected to the said first point associated with the said same secondary winding through a second switch unit, each of said switch units comprising a rectifier bridge circuit with a triggerable semi-conductor device connected across one diagonal of the bridge which triggerable semi-conductive device requires triggering in each cycle of the alternating current in the said circuit to render it conducting during that cycle and providing when triggered a bi-directional conducting path across the other diagonal of the bridge, and control means operatively connected to each of the said devices and responsive to the zero current instants of the alternating current in the said circuit to trigger the device of one of the two switch units associated with each secondary winding to render conducting either the first switch unit to connect the said secondary winding in series in the circuit or the second switch unit to by-pass the said secondary winding in the circuit without short circuiting it, the said control means comprising a saturating load current transformer connected in series in the said circuit to produce voltage impulses substantially at each zero current instant in the said circuit and of opposite polarity at each alternate current zero, a binary digital counter having a plurality of bit-stores one associated with each of the said transformer secondaries, each bit-store providing an output of one polarity when it registers zero and the reverse polarity when it registers one, a plurality of gating elements each operatively connected to one of the said bit-stores and to the said associated transformer secondary winding and also to the said load current saturating transformer to receive the said voltage impulses therefrom, each gating element comprising polarity-responsive rectifier means responsive to the polarity of the output of the bit-store to which it is connected, and a plurality of transformer means each connected to the polarity-responsive rectifier means and to one of the triggerable semi-conductor devices of one of the switch units of the transformer secondary winding with which the gating element is associated and also to the load current saturating transformer, the polarity-responsive rectifier means actuating the transformer means in response to the polarity of the output of the associated bit-store to gate each voltage impulse from the saturating load current transformer to trigger the semi-conductor device of one of the switch units of the associated transformer secondary winding to connect the said secondary winding as aforesaid, selected secondary windings being connected in series in the circuit in accordance with the binary number registered in the said binary counter.

8. Voltage or current regulator apparatus for regulating the voltage or current in a circuit in which an alternating current flows, comprising transformer means including a plurality of secondary windings, the output voltages of successive secondary windings being in geometrical progression of ratio two, there being first and second points in the said circuit associated with each one of the said secondary windings respectively, one end of each secondary winding being connected through a first switch unit to a first point in the circuit and also through a second switch unit to a second point in the circuit, and the other end of the said secondary winding being connected through a third switch unit to the said second point in the circuit and also through a fourth switch unit to the said first point in the circuit, the said second point associated with the said secondary winding being directly connected to the first point associated with the next secondary winding, each of said switch units comprising two triggerable semi-conductor devices each of which requires triggering in each cycle of the alternating current in the said circuit to render it conducting during that cycle, the said two devices being connected in parallel with each other and providing when both triggered a bi-directional conducting path, and control means operatively connected to each of the said devices and responsive to the zero current instants of the alternating current in the said circuit to repeatedly trigger the devices of two of the four switch units associated with each secondary winding to render conducting either the first and third switch units to connect the said secondary winding in series in the circuit in one polarity or the second and fourth switch units to connect the said secondary winding in series in the circuit in a reverse polarity opposite to the said one polarity, or to trigger none of the devices to by-pass the said secondary winding in the circuit without short circuiting it.

9. Voltage or current regulator apparatus as claimed in claim 8, in which the said transformer means further comprises a permanent secondary winding which is permanently connected in series in the circuit in the said one polarity, the output voltage of the said permanent secondary winding being equal to the sum of the respective output voltages of all the aforesaid secondary windings which are connectable to the circuit through switch means.

10. Voltage or current regulator apparatus as claimed in claim 9, in which the said transformer means comprises an auto-wound transformer having a tapped primary winding which provides the said permanent secondary winding.

11. Voltage or current regulator apparatus for regulating the voltage or current in a circuit in which an alternating current flows, comprising transformer means including a plurality of secondary windings, the output voltages of successive secondary windings being in geometrical progression of ratio two, there being first and second points in the said circuit associated with each one of the said secondary windings respectively, one end of each secondary winding being connected through a first switch unit to the said first point, and the other end of the said secondary winding being connected through a second switch unit to the said same first point, the secondary winding also having a center tap which is directly connected to the second point, and the said second point associated with the said secondary winding also being directly connected to the first point associated with the next secondary winding, each of said switch units comprising two triggerable semi-conductor devices each of which requires triggering in each cycle of the alternating current in the said circuit to render it conducting, the said two devices being connected in parallel with each other and providing when both triggered a bi-directional conducting path, and control means operatively connected to each of the said devices and responsive to the zero current instants of the alternating current in the said circuit to trigger one of the devices of one of the two switch units associated with selected ones of the secondary windings to render conducting one of the switch units to connect a selected half of the said selected secondary winding in series in the circuit.

12. Voltage or current regulator apparatus for regulating the voltage or current in a circuit in which an alternating current flows, comprising transformer means including a plurality of secondary windings, there being first and second points in the said circuit associated with each one of the said secondary windings respectively, the output voltages of successive secondary windings being in geometrical progression of ratio three, one end of each secondary winding being connected through a first switch unit to the first point in the circuit, and the other end of the said secondary winding being connected through a second switch unit to the said first point in the circuit, the said secondary winding also having a center tap which is both connected through a third switch unit to the said first point and also directly to the second point, the said second point associated with the said secondary winding also being directly connected to the first point associated with the next secondary winding, each of said switch units comprising two triggerable semi-conductor devices each of which requires triggering in each cycle of the alternating current in the said circuit to render it conducting, the said two devices being connected in parallel with each other and providing when both triggered a bi-directional conducting path, and control means operatively connected to each of the said devices and responsive to the zero current instants of the alternating current in the said circuit to repeatedly trigger the devices of one of the three switch units associated with selected ones of the secondary windings to render conducting either the first switch unit to connect one half of the said secondary winding in one polarity in series in the circuit or the second switch unit to connect the other half of the said secondary winding in the opposite polarity in series in the circuit or the third switch unit to by-pass the said secondary winding in the circuit without short circuiting it.

References Cited by the Examiner
UNITED STATES PATENTS

| | | | |
|---|---|---|---|
| 3,005,946 | 10/61 | Thompson | 323—24 |
| 3,018,431 | 1/62 | Goldstein | 323—45 |
| 3,056,906 | 10/62 | Peters | 323—25 X |

LLOYD McCOLLUM, *Primary Examiner.*